US009596366B1

(12) United States Patent
Smith et al.

(10) Patent No.: US 9,596,366 B1
(45) Date of Patent: Mar. 14, 2017

(54) VIDEO MAIL BETWEEN RESIDENTS OF CONTROLLED-ENVIRONMENT FACILITIES AND NON-RESIDENTS

(71) Applicant: Securus Technologies, Inc., Dallas, TX (US)

(72) Inventors: Matthew Richard Smith, McKinney, TX (US); Russell Wayne Roberts, Colleyville, TX (US); Ligit Koodarathil Mathew, Flower Mound, TX (US)

(73) Assignee: Securus Technologies, Inc., Dallas, TX (US)

( * ) Notice: Subject to any disclaimer, the term of this patent is extended or adjusted under 35 U.S.C. 154(b) by 116 days.

(21) Appl. No.: 14/507,627

(22) Filed: Oct. 6, 2014

(51) Int. Cl.
*H04M 11/00* (2006.01)
*H04N 1/00* (2006.01)

(52) U.S. Cl.
CPC .............................. *H04N 1/00127* (2013.01)

(58) Field of Classification Search
CPC ........ H04L 12/589; H04M 2203/4536; H04M 3/5307; H04M 3/533
USPC ..................................... 379/88.13; 348/207.1
See application file for complete search history.

(56) References Cited

U.S. PATENT DOCUMENTS

| | | | | |
|---|---|---|---|---|
| 5,543,850 A | * | 8/1996 | Pratt .................... | H04N 7/0255 348/564 |
| 2013/0194377 A1 | * | 8/2013 | Humphries .............. | H04N 7/15 348/14.08 |
| 2014/0150029 A1 | * | 5/2014 | Avedissian ......... | G06Q 30/0261 725/60 |
| 2014/0267540 A1 | * | 9/2014 | Torgersrud ........ | H04M 3/42374 348/14.01 |

* cited by examiner

*Primary Examiner* — Van D Huynh
(74) *Attorney, Agent, or Firm* — Fogarty LLP

(57) ABSTRACT

Providing video mail to and from residents of controlled-environment facilities may include presenting a resident or non-resident a user interface and receiving a selection to send video mail. Whereupon, the user may be offered a selection to either upload a video or image or to capture a video or image. A selection by the user is accepted and in response to a selection to upload a video or image file, the user may be presented a file selection interface to enter a video or image filename and/or browse for a video or image file. In response to a selection to capture a video or image, the user may be presented a video or image capture interface for capturing the video or image, such as by using a camera of the host device. The selected or recorded video or image may then be uploaded and presented to the recipient for viewing.

48 Claims, 4 Drawing Sheets

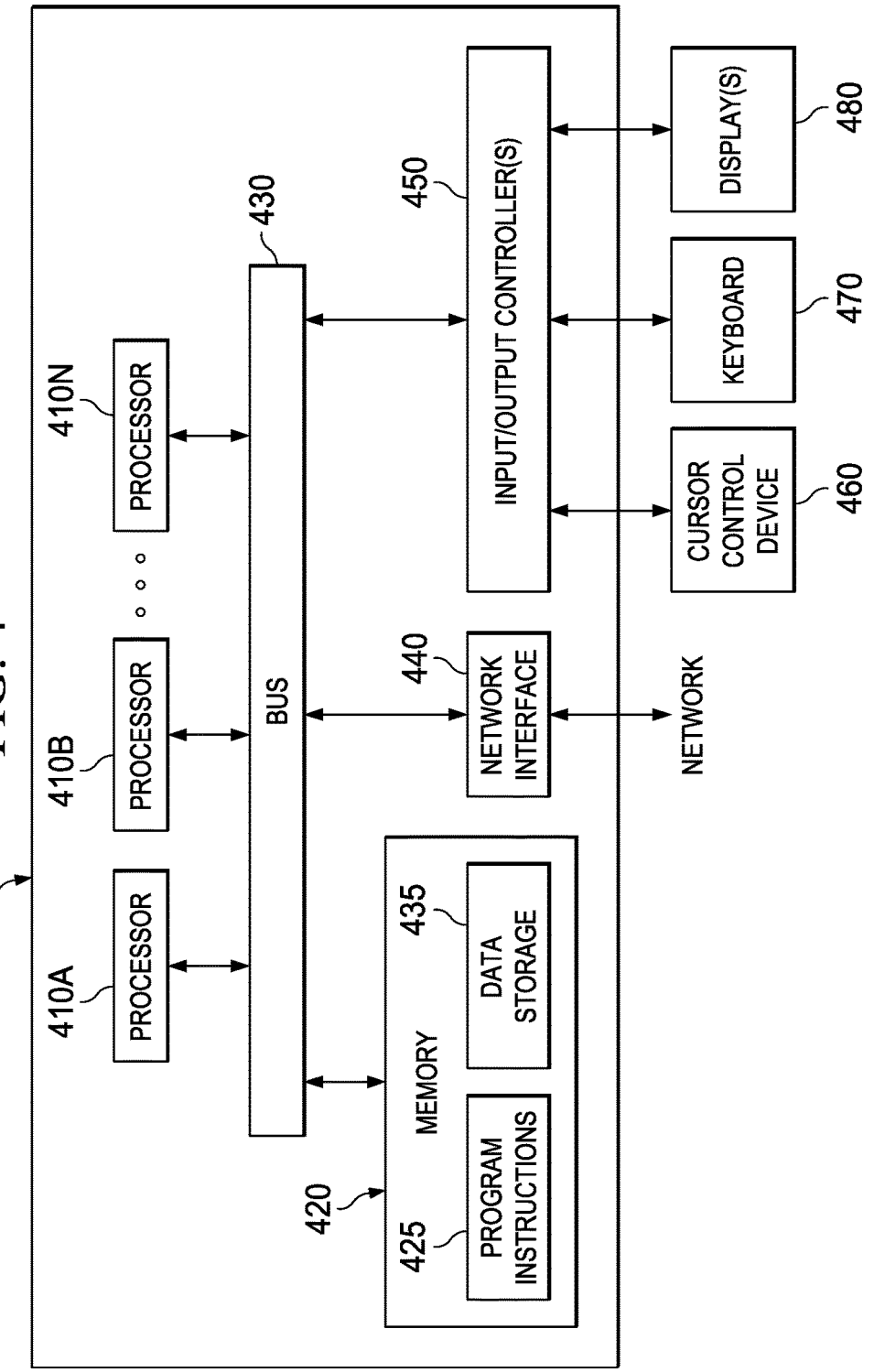

VIDEO MAIL BETWEEN RESIDENTS OF CONTROLLED-ENVIRONMENT FACILITIES AND NON-RESIDENTS

TECHNICAL FIELD

The present disclosure relates generally to communications to and from residents of controlled-environment facilities, specifically to communications sent from and to outside parties to and from residents of controlled-environment facilities, and particularly to video mail sent to and from outside parties from and to residents of controlled-environment facilities.

BACKGROUND

According to the International Centre for Prison Studies, the United States has the highest prison population per capita in the world. In 2009, for example, 1 out of every 135 U.S. residents was incarcerated. Generally, inmates convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated. During his or her incarceration, an inmate may have opportunities to communicate with the outside world.

By allowing prisoners to have some contact with friends and family while incarcerated, the justice system aims to facilitate their transition back into society upon release. Traditional forms of contact include telephone calls, in-person visitation, conjugal visits, etc. More recently, technological advances have allowed jails and prisons to provide other types of communication, including individual-to-individual videoconferences and online chat sessions.

Traditional communication services provided to residents of controlled-environment facilities (such as correctional facilities) may include allowing residents (inmates) to place outbound phone calls to non-residents of the controlled-environment facility. Additionally, non-residents can typically schedule video visitation with residents (inmates) of the controlled-environment facility. Other types of communication available to controlled-environment residents include the ability to exchange email and canned text messages between residents and non-residents of the controlled-environment facility.

To enable these various types of communications, a jail or prison may install communication devices in different parts of the facility. Such communication devices are dedicated to provide inmate contact with the outside world. These devices are located in different areas throughout the facility. Traditionally, controlled-environment facility communication vendors have provided services that allow residents of a controlled-environment facility to initiate phone calls. This is typically referred to as an inmate outbound call. Alternatively, non-residents of a controlled-environment facility can pay for a scheduled video visitation event to occur where both the resident and the non-resident log into a video visitation application at the scheduled time to have a video conversation.

Basically, all of these forms of communication aim to facilitate communication between a resident of a controlled-environment facility and a non-resident. There have traditionally been few, mechanisms for outside parties, even family members, to initiate communication with a resident of a controlled-environment facility. Use of an intermediary such as a common family member or friend of the resident is often challenging, since in many cases the resident would typically need to initiate an outbound communication to the intermediary before the resident could be given the message. Thus, constituents have no practical method to maintain proactive contact with residents of a controlled-environment facility due to these limitations in terms of communication options.

SUMMARY

The present invention is directed to systems and methods, which provide video mail from non-residents to residents of the controlled-environment facility and/or from controlled-environment facility residents to non-residents. Embodiments of the controlled-environment facility communication systems and methods present the non-resident a user interface, such as on a non-resident device, which may be a personnel communications device such as a smartphone, media player, tablet, personal computer, or any other device capable of technology for capturing or sharing video, images, or the like. The present systems and methods may receive a selection of the non-resident, via the user interface, to send non-resident video mail to a resident of a controlled-environment facility, whereupon the non-resident may be offered, via the user interface, a selection to either upload a non-resident video or image or to capture a non-resident video or image. The present systems and methods may then accept from the non-resident the selection via the user interface to upload the non-resident video or image or to capture the non-resident video or image. In response to a selection by the non-resident to upload a non-resident video or image file, the non-resident may be presented, via the user interface, a non-resident file selection interface to enter a non-resident video or image filename and/or browse for a non-resident video or image file. However, in response to a selection by the non-resident to capture a non-resident video or image, the non-resident may be presented a non-resident video or image capture interface, via the user interface, for capturing the non-resident video or image, via the non-resident video or image capture interface, such as by using a camera of the non-resident device.

The selected or recorded non-resident video or image may be uploaded and presented to the resident of the controlled-environment facility for viewing using the controlled-environment facility communications system, or the like, or alternatively, a resident media device approved and/or adapted for use in the controlled-environment facility by the resident.

The resident may be presented a resident interface on a terminal, or the like of the controlled-environment facility communications system or on a resident media device, which provides the resident a selection to view the non-resident video or image, such as, via the resident interface. This same interface may be used to initiate video mail to a non-resident. In accordance with some embodiments of the present systems and methods, the resident interface may present the resident an option to send a reply resident video or image to the non-resident, and/or an initial video mail. An option to send the reply resident video or image to the non-resident may be presented as a result of the resident selecting to view the non-resident video or image, and may be presented during and/or following playback of the non-resident video or image. In accordance with such embodiments, the resident interface may receive a selection by the resident to send a return, or initial, resident video mail to the non-resident. Further, this option to send the non-resident a video or image may, in some embodiments, be an option to capture and send a resident video or image to the non-resident, or an option to upload and send an existing video or image. The present systems or methods accept, via the resident interface, a resident's selection to upload a resident video or image or to capture a resident video or image. The resident is provided a resident file name entry interface, via the resident interface, to enter a resident video or image filename and/or an option to browse for a resident video or image file, in response to selection by the resident to upload a resident video or image file. Alternatively, in response to a selection by the resident to capture a resident video or image the resident is provided a resident video or image capture interface for capturing a resident video or image using a camera connected to the controlled-environment facility communications system or incorporated into the resident media device. The selected or recorded resident video or image is then uploaded and presented to the non-resident on the non-resident device, such as via the non-resident interface.

In accordance with some embodiments of the present systems and methods, the controlled-environment facility may be a correctional facility, jail, or the like and the resident is a prisoner, inmate, detainee, arrestee, or the like.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processors, wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 1:
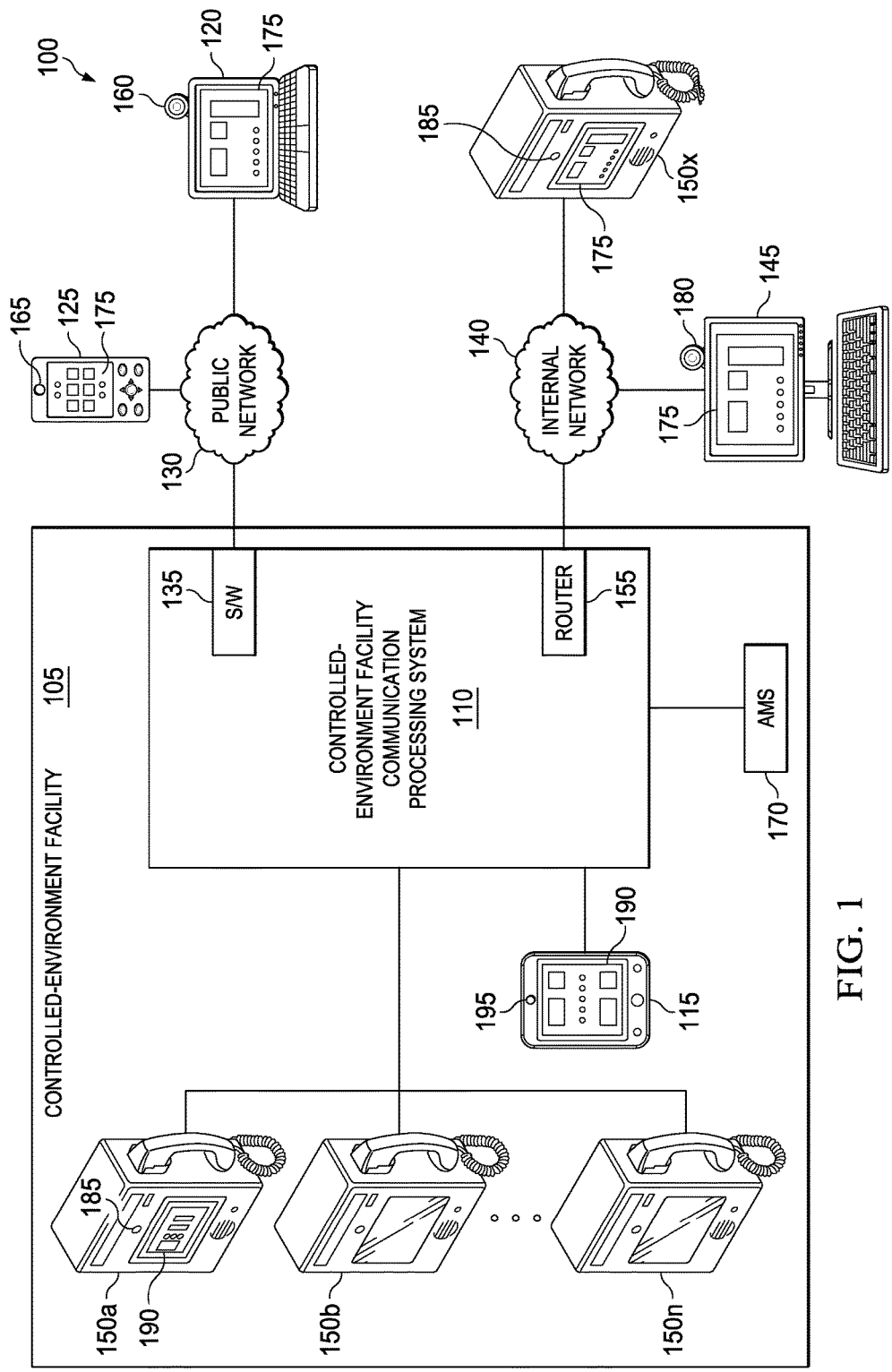
Figure 2:
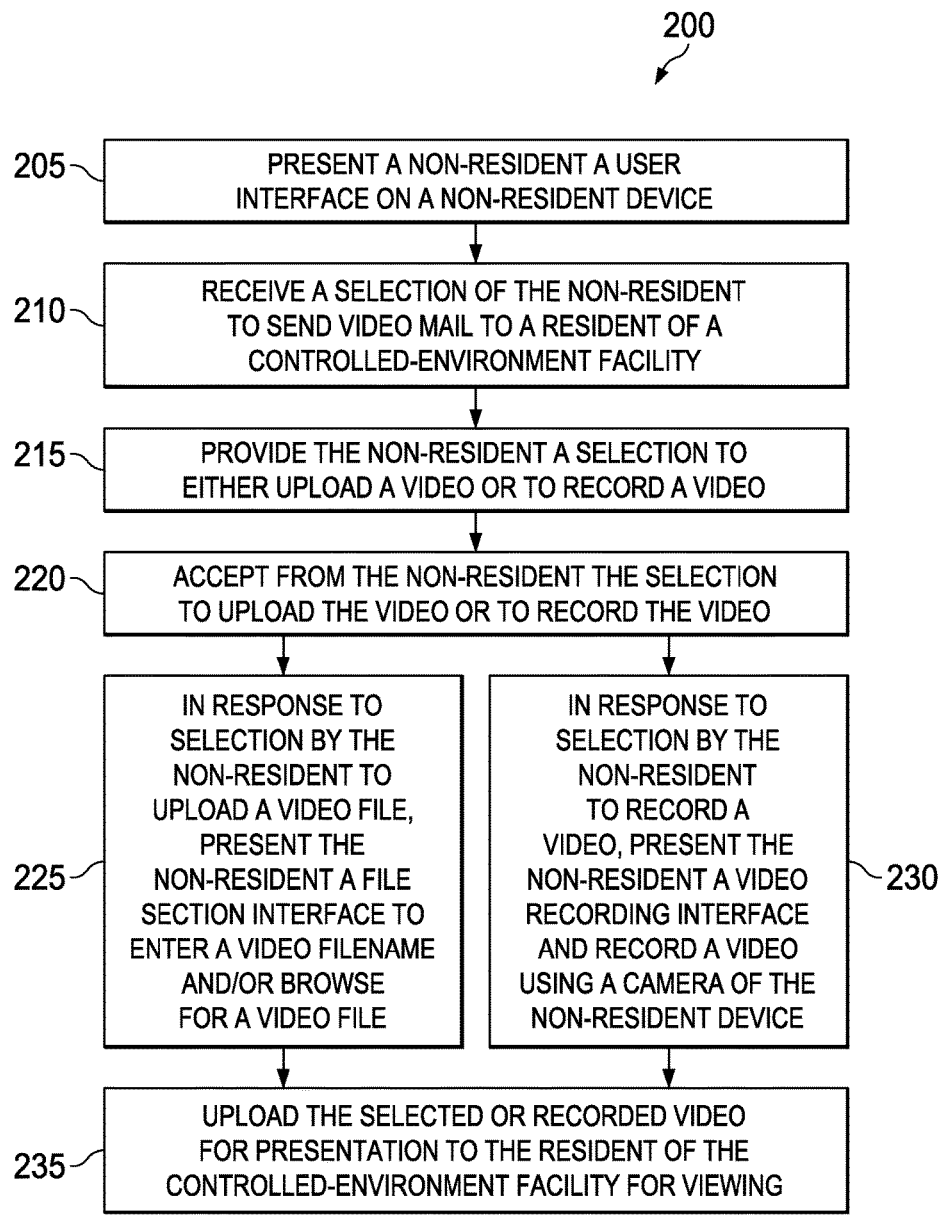
Figure 3:
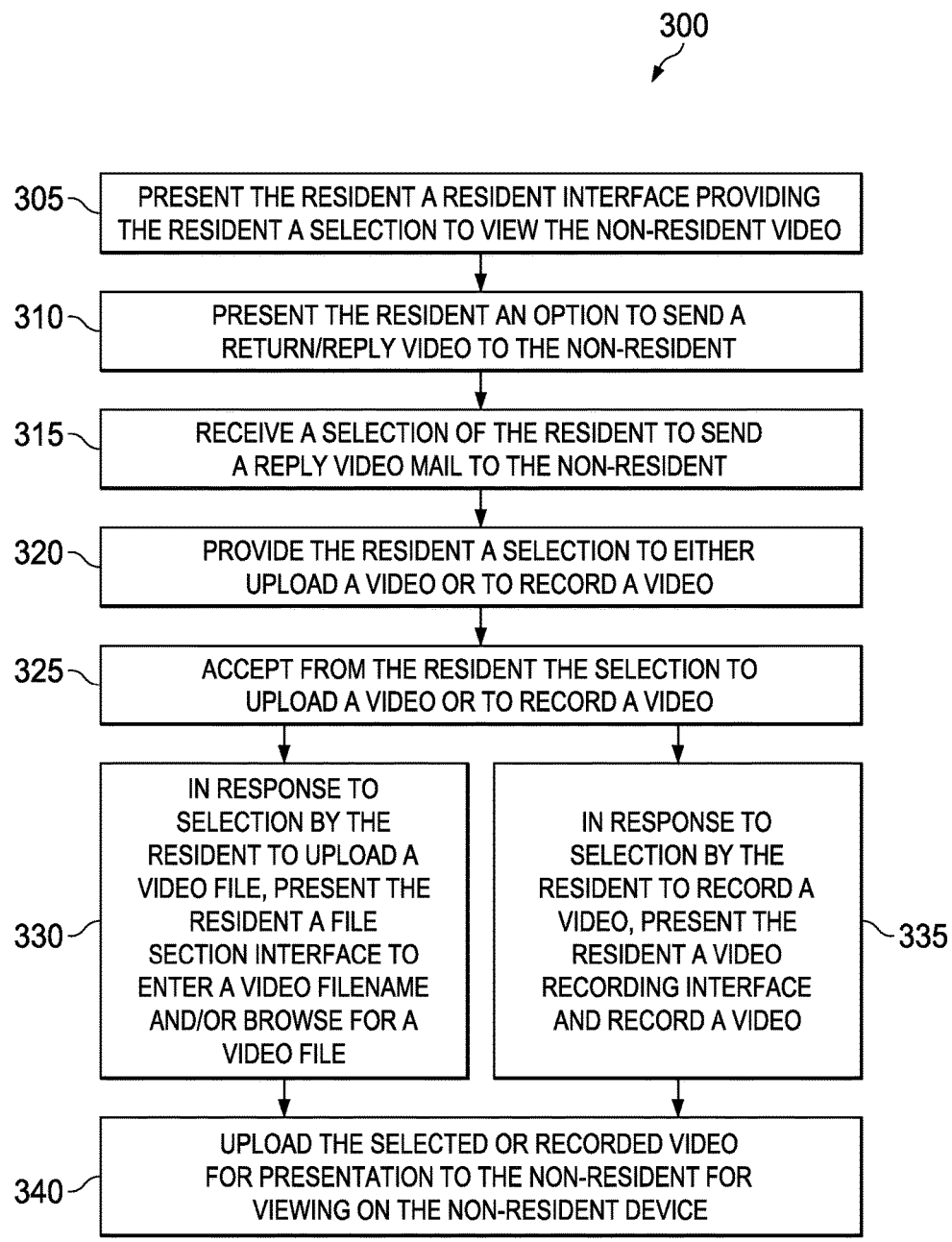

Having thus described the invention in general terms, reference will now be made to the accompanying drawings, which are not necessarily drawn to scale, and wherein:

FIG. 1 is a diagrammatic illustration of an example of a communications environment, wherein an example embodiment of the present systems and methods for video mail to and from residents of controlled-environment facilities is shown deployed in conjunction with a controlled-environment facility, according to some embodiments;

FIG. 2 is a flowchart of an example implementation of a process for providing outside initiated video mail to residents of controlled-environment facilities from non-residents, according to some embodiments;

FIG. 3 is a flowchart of an example implementation of a process for enabling a resident of a controlled-environment facility to view and/or send video mail to a non-resident, according to some embodiments; and FIG. 4 is a block diagram of an example of a computer system configured to implement various systems and methods described herein, according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, or detainees. It should be understood, however, that the systems and methods described herein may be similarly applicable to other types of controlled-environment facilities and their respective residents (e.g., a hospital and its patients, a school dormitory and its students, etc.). As a further example, as used herein the term "video mail" includes, but is not limited to, an electronic message that may include a video recording, one or more digital photographic images, or the like, which may include audio and/or text or captions.

As noted, the present disclosure relates generally to communications to residents of controlled-environment facilities, specifically to communications sent to or from outside parties (non-residents) to residents of controlled-environment facilities, and particularly to video mail sent from or to outside parties to of from residents of controlled-environment facilities. In accordance with embodiments of the present systems and methods, providing video mail initiated by non-residents or residents of controlled-environment facilities may include presenting the non-resident or resident a user interface and receiving a selection by the non-resident or resident to send video mail. Whereupon, the non-resident or resident may be offered a selection to either upload a video or image or to capture a video or an image. A selection by the non-resident or resident is accepted and in response to selection by the non-resident or resident to upload a video or image file, the non-resident or resident may be presented a file selection interface to enter a video or image filename and/or to browse for a video or image file. In response to selection by the non-resident or resident to capture a video or an image, the non-resident or resident may be presented a video and/or image capture interface for recording the video or capturing an image, such as by using a camera of the device providing the interface. The selected or recorded video or image may then be uploaded and presented to the resident of the controlled-environment facility or non-resident for viewing.

Thus, if constituents want to maintain proactive contact with a resident of a controlled-environment facility they may take advantage of embodiments of the present systems and methods to expand their communication options. While traditionally, constituents may want to receive a telephone call from a controlled-environment facility resident, may send mail through the postal service, or may drive to or set-up a video visitation with a resident, none of these communication options provide the instant proactive gratification of video mail, such as offered by embodiments of the present systems and methods.

In accordance with embodiments of the present systems and methods, a constituent may send video mail to residents of a controlled-environment facility using an interface or the like, such as may be provided by a controlled-environment facility communications provider, the controlled-environment facility itself, a governmental agency associated with the controlled-environment facility, etc. This interface may be a unified interface that enables the constituent to perform any number of transactions related the residents of controlled-environment facilities, such as make deposits to trust, commissary, or communication accounts maintained t the benefit of residents, check on the present status of such residents, etc. In accordance with embodiments of the present systems and methods, the constituent is enabled to employ such an online interface to either upload a picture or video from their computer, mobile device, or the like, or take a picture or record a video and upload it, directly. The constituent may then use the same interface to select a controlled-environment facility, select a resident, and send the video mail. In accordance with various embodiments of the present systems and methods, this video may be limited or increased/extended by size, duration, and/or the like.

Residents are able to retrieve the video mail, in accordance with various embodiments of the present systems and methods, through software and hardware that resides at the controlled-environment facility, and/or that is otherwise associated with the controlled-environment facility. For example, the resident may be provided an ability to watch and/or listen to the message a configurable number of times or for a configurable duration of time. As an additional service, residents may be able to pay for, and send, a return/reply video message or pay to extend the duration for which the initial message is retained and available for viewing.

In accordance with embodiments of the present systems and methods, an authorized facility administrator may be able to review and/or retrieve video messages. Such administrators may also be able to pre-approve, delete, and/or edit the video or image, such as by adding their own message to the front and/or back of the video message.

FIG. 1 is a diagrammatic illustration of an example of a communications environment, wherein example embodiment 100 of the present systems and methods for video mail to and from residents of controlled-environment facilities from and to non-residents is shown deployed in conjunction with controlled-environment facility 105, according to some embodiments. Therein, communication processing system 110 may provide telephone services, videoconferencing, online chat, and other communication services to residents of controlled-environment facility 105. In some cases, communication system 110 may be co-located with a controlled-environment facility, as illustrated. Alternatively, communication system 110 may be centrally or remotely located, in whole or in part with respect to one or more controlled-environment facilities and/or may provide communication services to multiple controlled-environment facilities. More generally, however, it should be noted that communication system 110 may assume a variety of forms, and may be configured to serve a variety of facilities and/or users, whether within or outside of a controlled-environment facility.

In some controlled-environment facility facilities, residents may access communication services, or the like, using a personal wireless media device, 115, which may be a tablet computing device, media player, or the like, approved and/or adapted for use in controlled-environment facility 105. Under control of communication processing system 110, resident media device 115 may be capable of connecting to a non-resident's (i.e., a person not incarcerated or otherwise committed to a controlled-environment facility) personal computer 120, or the like, a personnel communications device such as smartphone 125, a media player, or the like, across public data network 130. Switch 135, or media gateway functionality, associated with communication processing system 110 may be used to connect calls and/or otherwise provide voice and/or data communications across public data network 130 to non-resident device 120 or 125. Public data network 130 may be an Integrated Services Digital Network (ISDN), Voice-over-IP (VoIP), or packet data network, such as, for example the Internet.

Internal network 140 may provide packet-based data to internal devices intended for non-resident use, such as terminal 145 and/or non-resident video visitation device 150X. Router 155 of communication system 110 is used to route data packets associated with a call connection to devices 145 or 150X. Internal network 140 may be internal to controlled-environment facility 105 and/or may extend outside of controlled-environment facility 105, as illustrated. For example, terminal 145 and/or non-resident video visitation device 150X may be disposed in a visitation area of controlled-environment facility 105, within adjacent to, or remote with respect controlled-environment facility 105, itself.

Intelligent facility or video visitation devices 150A-N and X are each a telephone/videophone terminal that may have video conferencing capabilities to enable residents, such as inmates in a correctional facility, to participate in video visitation sessions with non-residents of the controlled-environment facility via video communication, secure online chat, etc. For example, a non-resident party may use internal terminal 145 or video visitation device 150X, have a personal or laptop computer 120 with camera 160 (or a cell phone, tablet computer, etc. 125). Additionally or alternatively, non-resident device 125 may have an integrated camera 165 and display (e.g., a smart phone, tablet, etc.). A network connection between the parties may be established and supported by a facility, organization or commercial service that provides computer services and software for use in telecommunications and/or Voice Over Internet Protocol (VOIP). Additionally or alternatively, the correctional facility and/or the destination may use videoconferencing equipment compatible with ITU H.323, H.320, H.264, and/or V.80, or other suitable standards. Telephone/videophone terminals 150, which, as noted, may be referred to as intelligent facility devices may be a replacement for typical telephones provided in controlled-environment facilities, such as rehabilitation centers, jails and prisons, utilizing existing facility telephony wiring. While telephone/videophone terminal 150 is illustrated in FIG. 1 as a hardened, wall mounted device this intelligent facility device may also take the form of a kiosk-type terminal or tablet. The intelligent facility device may replace a typical pay phone found in some facilities and may provide touch screen computer functionality that enables a resident to perform "self service" tasks such as setting up doctor appointments, scheduling visitation, viewing schedules, and checking the status of his or her case. The intelligent facility device may include an RFID or biometric reader, or the like to enable precise identification of each resident. In addition, the intelligent facility device includes, as noted, a built-in camera and telephone handset to enable a resident to use video conferencing to meet face to face with attorneys, family and friends. Generally speaking, each video visitation device 150 may be disposed in a visitation room, in a pod, kiosk, etc.

In some embodiments, video visitation device 150 may be implemented as a computer-based system, and/or may assume the form of any computer, tablet computer, smart phone, etc., or any other consumer device or appliance with videoconferencing capabilities. For example, each of video visitation devices 150 may include a display, camera, and handset (or microphone and speaker). The display may be any suitable electronic display such as, for example, a Liquid Crystal Display (LCD), a touchscreen display (e.g., resistive, capacitive, etc.), or the like, whereas the camera may be any suitable imaging device such as, for instance, a video camera or webcam equipped with Charge-Coupled Devices (CCDs), Complementary Metal-Oxide-Semiconductor (CMOS) active pixel sensors, etc. A handset may be similar to a traditional telephone handset including an earpiece portion (with a loudspeaker), a handle portion, and a mouthpiece portion (with a microphone).

Controlled-environment facility resident media device 115, which may be referred to as an intelligent resident device, may be a specially adapted, or otherwise facility approved, controlled-environment facility resident tablet computing device, media player, or the like. Resident media device 115 may be adapted, and/or approved for use by residents of the controlled-environment facility, within the controlled-environment facility. For example, each tablet computing device 115 may be particularly adapted for use in a controlled-environment, such as, in a correctional institution, jail, or the like, such a tablet computing device may have a specially adapted operating system and/or may be "stripped-down," particularly from the standpoint of what applications programs (apps) and/or hardware are provided or allowed on tablet computing device 115, and/or connectivity afforded to such a tablet computing device. By way of example, such a resident tablet computing device may employ an operating system kernel based upon an open source platform such as the CyanogenMod ANDROID™-based operating system, which may be rebuilt for use in such a tablet computing device in a controlled-environment facility. In such an example, the tablet computing device may be adapted to only connect to a network provided by the controlled-environment facility. Also, the resident tablet may have a few fixed apps pre-installed on the device, and installation of further apps on the device may be forbidden (i.e. prevented by modifications to the device's operating system, or the like) and/or restricted, such as by requiring permission from a facility administrator, or the like. Apps provided on resident tablets might include apps of particular interest to residents of the controlled-environment facility. For example, tablet computing devices provided to inmates of correctional facilities, might include apps that may be of particular use to an inmate, in general, such as access to a legal research service, or of more specific interest, such as providing an inmate nearing release, access to employment searching apps or the like. Hence, such inmate tablet computing devices may be used to help soon to be released inmates transition. For example, the tablet may be used to communicate with a future employer, or the like. As such, tablets may be sponsored, or otherwise subsidized by organizations or companies, assisting with the transition of inmates into society.

In some implementations, communication system 110 may be configured to perform video monitoring operations configured to monitor and copy video messages. In scenarios where communication system 110 is located within the controlled-environment facility, it may have direct access to and Administration Management System (AMS) or Jail Management system (JMS) 170. In other embodiments, however, communication system 110 may be located remotely with respect to the controlled-environment facility, and access to AMS or JMS 170 may be obtained via a computer network such as, for example, networks 130 or 140.

In various implementations controlled-environment facility communications system 100 for providing video mail from or to non-residents, to or from residents of the controlled-environment facility may present the non-resident a user interface (175), such as on a non-resident device 120 or 125, terminal 145 or video visitation device 150X. System 100 may receive a selection by the non-resident, via user interface 175, to send non-resident video mail to a resident of controlled-environment facility 105, whereupon the non-resident may be offered, via user interface 175, a selection to either upload a non-resident video or image or to capture a non-resident video or non-resident image. The present systems and methods may then accept from the non-resident the selection via user interface 175 to upload the non-resident video or image or to capture the non-resident video or image. In response to selection by the non-resident to upload a non-resident video or image file, the non-resident may be presented, via user interface 175, a non-resident file selection interface to enter a non-resident video or image filename and/or browse for a non-resident video or image file. However, in response to selection by the non-resident to capture a non-resident video or image, the non-resident may be presented a non-resident video or image capture interface, via user interface 175 for recording the non-resident video or capturing the non-resident image, via the non-resident video or image capture interface, such as by using camera 160 or 165 of non-resident device 120 or 125, or camera 180 or 185 of terminal 145 or video visitation device 150X.

The selected or recorded non-resident video or image may be uploaded and presented to the resident of the controlled-environment facility for viewing using controlled-environment facility communications system 110, or the like, such as via one intelligent facility devices 150, or alternatively, via resident media device 115, approved and/or adapted for use in the controlled-environment facility by the resident.

The resident may be presented a resident interface (190) on one of terminals 150(a), or the like of controlled-environment facility communications system 110 or on resident media device 115, which provides the resident a selection to view the non-resident video or image, such as, via resident interface 190. Additionally and/or alternatively, resident interface 190 may present the resident an option to send a resident video or image to the non-resident, such as an initial video or image to the non-resident or in reply to a video or image sent by the non-resident. Resident interface 190 may receive a selection by the resident to send a resident video mail to the non-resident. This option to send the resident video or image to the non-resident may be presented as a result of the resident selecting to view a non-resident video or image, and may be presented during and/or following playback of the non-resident video or image. Further, this option to send the non-resident a resident video or image may, in some embodiments, be an option to capture and send a resident video or image to the non-resident, or an option to upload and send an existing video or image. The present systems or methods accept, via resident interface 190, a resident selection to upload a resident video or image or to capture a resident video or image. In response to selection by the resident to upload a resident video or image file, the resident is provided a resident file name entry interface, via the resident interface, to enter a resident video or image filename and/or an option to browse for a resident video or image file. Alternatively, in response to selection by the resident to capture a resident video or image, the resident is provided a resident video or image capture interface for capturing a resident video or image using camera 185 or 195 connected to or incorporated into controlled-environment facility communications system intelligent facility device 150(A) or incorporated into resident media device 115. The selected or recorded resident video or image is then uploaded and presented to the non-resident on the non-resident device, such as via the non-resident interface 175.

Controlled-environment facility communications management system 110 may store non-resident and/or resident video mail for a predetermined time, and/or limit the size or duration of non-resident or resident video mail to a predetermined length or size. In accordance with various embodiments of the present systems and methods, the resident may be presented, such as via resident interface 190, and/or the non-resident may be presented, such as via the non-resident user interface 175, an option to extend a predetermined storage time of non-resident and/or resident videos or images. Similarly, the resident and/or the non-resident may be presented, via the resident or non-resident user interface, an option to expand a permitted size or duration of non-resident or resident video mail, in accordance with various embodiments of the present systems and methods. Controlled-environment facility communications management system 110 may charge the resident (i.e. a resident communications account, or the like) and/or the non-resident (such as via a credit card, or the like) for such extension or expansion.

As noted, in accordance with embodiments of the present systems and methods, an authorized facility administrator, or an investigator, may be able to review and/or retrieve video messages. Such administrators or investigators may also be able to pre-approve, delete, and/or edit the video or image, such as by adding their own message to the front and/or back of the video message. Such review and/or notation may be carried out employing controlled-environment facility communications management system 110, employing the aforementioned video monitoring operations, such as in conjunction with AMS 170. Moreover, controlled-environment facility communications management system 110 may, in an automated matter, confirm parties' (resident and/or non-resident) identities through personal identification numbers (PINs), other identifying information or biometrics. Further biometrics, such as facial recognition, voice recognition, or the like may be used to confirm the identities of residents and/or non-residents in videos or images exchanged in accordance with embodiments of the present systems and methods. Similarly, controlled-environment facility communications management system 110 may autonomously screen the audio portion of resident and/or non-resident videos for keywords, profanity and/or other offensive or significant words or sounds. In a like manner, video or images may be screened in an automated manner, by controlled-environment facility communications management system 110 for gang signs, hand signals, hidden messages or the like, such as through gesture or optical marking recognition. In investigative embodiments, the controlled-environment facility communications management system 110 may send alerts or flag questionable messages, and may identify a particular point in a message, such as a particular time index in a video, which should be reviewed by an investigator and/or administrator.

FIG. 2 is a flowchart of an example implementation of process 200 for providing outside initiated video mail to residents of controlled-environment facilities from non-residents, according to some embodiments. Therein, embodiments of the controlled-environment facility communication systems and methods may present the non-resident a user interface (175) at 205, such as on a non-resident device (120, 125, 145, 150X), which may be a personal computer or the like, or a personnel communications device such as a smartphone, media player, or the like, etc. The present systems and methods may receive a selection of the non-resident at 210, via the user interface, to send non-resident video mail to a resident of a controlled-environment facility, whereupon the non-resident may be offered, via the user interface at 215, a selection to either upload a non-resident video or image or to capture a non-resident video or image. The present systems and methods may then, at 220, accept from the non-resident the selection via the user interface to either upload the non-resident video or image, or to capture the non-resident video or image. In response to selection by the non-resident to upload a non-resident video or image file, the non-resident may be presented, via the user interface at 225, a non-resident file selection interface to enter a non-resident video or image filename and/or to browse for a non-resident video or image file. However, in response to selection by the non-resident to capture a non-resident video or image, the non-resident may, at 230 be presented a non-resident video or image capture interface, via the user interface for capturing the non-resident video or image, via the non-resident video or image capture interface, such as by using a camera (160, 165, 180, 185) of the non-resident device.

At 235, the selected or recorded non-resident video or image may be uploaded and presented to the resident of the controlled-environment facility for viewing using a controlled-environment facility communications system (110), or the like, or alternatively, a resident media device (115) approved and/or adapted for use in the controlled-environment facility (105) by the resident.

FIG. 3 is a flowchart of an example implementation of process 300 for enabling a resident of a controlled-environment facility to view video mail from, and/or to send video mail to, a non-resident, according to some embodiments. In accordance with process implementation 300, the resident may be presented a resident interface (190) on a terminal (150), or the like of a controlled-environment facility communications system (110) or on a resident media device (115), at 305. This resident interface may prompt the resident to provide identification data, such as a PIN, other identifying information or biometrics, and upon verification provide the resident a selection to view a non-resident video or image (sent at 235). At 310 the resident interface may present the resident an option to send an initial or reply resident video or image to a non-resident and may receive a selection by the resident to send a resident video mail to the non-resident at 315. An option to send the reply resident video or image to the non-resident may be presented as a result of the resident selecting to view the non-resident video or image via the resident interface, and may be presented during and/or following playback of the non-resident video or image. Further, this option to send the non-resident a resident video or image may, in some embodiments, be, or include an option (such as at 320) to capture and send a resident video or image to the non-resident, or an option to upload and send an existing resident video or image. The present systems or methods accept, at 325, via the resident interface, a resident selection to upload a resident video or image or to capture a resident video or image. In response to selection by the resident to upload a resident video or image file, the resident is provided a resident file name entry interface, via the resident interface, to enter a resident video or image filename and/or an option to browse for a resident video or image file, at 330. Alternatively, in response to selection by the resident to capture a resident video or image the resident is provided a resident video or image capture interface for capturing a resident video or image at 335, using a camera connected to the controlled-environment facility communications system or incorporated into the resident media device. The selected or recorded resident video or image is then uploaded and presented to the non-resident on a non-resident device (120, 125, 145, 150X), at 340, such as via a non-resident interface (175).

In accordance with further embodiments of either of process implementations 200 or 300, the resident may be presented, such as via the resident interface, and/or the non-resident may be presented, such as via the non-resident user interface, an option to pay to extend a predetermined storage time of non-resident and/or resident videos or images. Similarly, the resident and/or the non-resident may be presented, via the resident or non-resident user interface, an option to pay to expand a permitted size or duration of non-resident or resident video mail, in accordance with various embodiments of the present systems and methods. In various embodiments of the present systems and methods the non-resident and/or resident may be provided an option, such as via the respective user interface, to add a caption to the respective selected or recorded video or image.

Further, in accordance with further embodiments of either of process implementations 200 or 300, prior to presenting the uploaded videos or images for viewing, an identity of the resident and/or non-resident in uploaded videos or images may be confirmed, such as by controlled-environment facility communications system 110, employing biometrics. The uploaded videos or images for keywords, may also be screened for profanity, gang signs, hand signals and/or hidden messages through controlled-environment facility communications system 110 employing speech, gesture and/or optical marking recognition. An alert may be sent to an investigator and/or controlled-environment facility administrator and/or a questionable uploaded videos or images may be flagged, identifying a particular point in the questionable uploaded videos. In various embodiments of the present systems and methods an investigator may be provided an interface to review uploaded videos or images prior to presenting the uploaded videos or images for viewing. This investigator interface may provide the investigator an option to flag and/or append a note to uploaded videos or images.

Embodiments of the present systems and methods for providing video mail to and from residents of controlled-environment facilities, as described herein, may be implemented or executed, at least in part, by one or more computer systems. One such computer system is illustrated in FIG. 4. In various embodiments, computer system 400 may be a server, a mainframe computer system, a workstation, a network computer, a desktop computer, a laptop, a tablet computing device, media player, or the like. For example, in some cases, computer 400 may implement one or more steps of example processes 200 and/or 300, described above with respect to FIGS. 2 and 3, and/or a computer system such as computer system 400 may be used as, or as part of, one or more of controlled-environment facility communication processing system 110, nonresident devices 120 and/or 125, resident media device 115, intelligent facility devices 150A-N and X, controlled environment facility management system 170, and/or the like. In various embodiments two or more of these computer systems may be configured to communicate with each other in any suitable way, such as, for example, via a network (e.g., in FIG. 1, non-resident devices 120 and 125 are illustrated as communicating with controlled-environment facility communication processing system 110, such as via network 140).

As illustrated, example computer system 400 includes one or more processors 410 coupled to a system memory 420 via an input/output (I/O) interface 430. Example computer system 400 further includes a network interface 440 coupled to I/O interface 430, and one or more input/output devices 450, such as video device(s) 460 (e.g., a camera), audio device(s) 470 (e.g., a microphone and/or a speaker), and display(s) 480. Computer system 400 may also include a cursor control device (e.g., a mouse or touchpad), a keyboard, etc. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

In various embodiments, computer system 400 may be a single-processor system including one processor 410, or a multi-processor system including two or more processors 410 (e.g., two, four, eight, or another suitable number). Processors 410 may be any processor capable of executing program instructions. For example, in various embodiments, processors 410 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 410 may commonly, but not necessarily, implement the same ISA. Also, in some embodiments, at least one processor 410 may be a graphics processing unit (GPU) or other dedicated graphics-rendering device.

System memory 420 may be configured to store program instructions and/or data accessible by processor 410. In various embodiments, system memory 420 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described in connection with FIGS. 1 through 3, above, may be stored within system memory 420 as program instructions 425 and data storage 435, respectively. In other embodiments, program instructions and/or data may be received, sent or stored upon different types of computer-accessible media or on similar media separate from system memory 420 or computer system 400. Generally speaking, a computer-readable medium may include any tangible or non-transitory storage media or memory media such as magnetic or optical media—e.g., disk or CD/DVD-ROM coupled to computer system 400 via I/O interface 430, Flash memory, Random Access Memory (RAM), etc. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 440.

In some embodiments, I/O interface 430 may be configured to coordinate I/O traffic between processor 410, system memory 420, and any peripheral devices in the device, including network interface 440 or other peripheral interfaces, such as input/output devices 450. In some embodiments, I/O interface 430 may perform any suitable protocol, timing or other data transformations to convert data signals from one component (e.g., system memory 420) into a format usable by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. In addition, in some embodiments, some or all of the functionality of I/O interface 430, such as an interface to system memory 420, may be incorporated into processor 410.

Network interface 440 may be configured to allow data to be exchanged between computer system 400 and other devices attached to a network, such as other computer systems, or between nodes of computer system 400. In various embodiments, network interface 440 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

As shown in FIG. 4, memory 420 may include program instructions 425, configured to implement certain embodiments described herein, and data storage 435, comprising various data accessible by program instructions 425. In an embodiment, program instructions 425 may include software elements corresponding to one or more of the various embodiments illustrated in the above figures. For example, program instructions 425 may be implemented in various embodiments using any desired programming language, scripting language, or combination of programming languages and/or scripting languages (e.g., C, C++, C#, JAVA®, JAVASCRIPT®, PERL®, etc.). Data storage 435 may include data that may be used in these embodiments. In other embodiments, other or different software elements and data may be included.

A person of ordinary skill in the art will appreciate that computer system 400 is merely illustrative and is not intended to limit the scope of the disclosure described herein. In particular, the computer system and devices may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:
1. A method, comprising:
    performing, by one or more computer systems:
        providing a user a user interface, the user being a non-resident of a controlled-environment facility;
        receiving a selection of the user, via the user interface, to send user video mail to a resident of a controlled-environment facility;
        providing the user, via the user interface, a selection of a video or image, wherein the selection options provided to the user include uploading a user video or image and capturing a user video or image;
        accepting a selection option from the user;
        providing the user, via the user interface, a user file selection interface to enter a user video or image filename and/or browse for a user video or image file, in response to selection by the user to upload a user video or image file;

providing the user, via the user interface, a user video or image capture interface and capturing a user video or image, via the user video or image capture interface, in response to selection by the user to capture a user video or image;

providing the user, via the user interface, an option to extend predetermined storage limits applicable to the selected user video or image file or the recorded user video or image;

uploading the selected user video or image file or the recorded user video or image; and presenting a resulting uploaded user video or image to the resident of the controlled-environment facility for viewing.

2. The method of claim 1, wherein providing the user the user interface comprises providing the user interface on a computer system of the user.

3. The method of claim 2, wherein capturing a user video or image via the user video or image capture interface employs a camera of, or connected to, the computer system of the user.

4. The method of claim 1, wherein presenting the uploaded user video or image to the resident comprises providing the resident a resident interface.

5. The method of claim 4, wherein providing the resident the resident interface comprises providing the resident interface on a computer system of the controlled-environment facility.

6. The method of claim 4, wherein providing the resident the resident interface comprises providing the resident interface on a resident media device approved and/or adapted for use in the controlled-environment facility by the resident.

7. The method of claim 4, wherein providing the resident the resident interface further comprises:

presenting the resident a selection to view the user video or image;

presenting the resident an option to send a reply resident video or image to the user;

receiving a selection of the resident, via the resident interface, to send a return resident video mail to the user;

providing the resident, via the resident interface, a selection to either upload a video or image or to capture a resident video or image;

accepting from the resident the selection via the resident interface to upload a resident video or image or to capture a resident video or image;

providing the resident, via the resident interface, a resident file name entry interface to enter a resident video or image filename and/or an option to browse for a resident video or image file, in response to selection by the resident to upload a resident video or image file;

providing the resident, via the resident interface, a resident video or image capture interface and capturing a resident video or image, via the resident video or image capture interface, in response to selection by the resident to capture a resident video or image;

uploading a selected or recorded resident video or image; and presenting a resulting uploaded resident video or image to the user.

8. The method of claim 7, wherein the option to send the reply resident video or image to the user is presented as a result of the resident selecting to view the user video or image, during and/or following playback of the user video or image.

9. The method of claim 1, wherein the predetermined storage limits comprise at least one of a storage time and a file size for the video or image.

10. The method of claim 7, wherein providing the resident the resident interface comprises providing the resident interface on a computer system of the controlled-environment facility, and capturing a resident video or image via the resident video or image capture interface employs a camera of, or connected to, the controlled-environment facility computer system.

11. The method of claim 7, wherein providing the resident the resident interface comprises providing the resident interface on a resident media device approved and/or adapted for use in the controlled-environment facility by the resident, and capturing a resident video or image via the resident video or image capture interface employs a camera incorporated into the resident media device.

12. The method of claim 1, wherein the controlled-environment facility is a correctional facility and wherein the resident is a prisoner, inmate, detainee, or arrestee.

13. The method of claim 1 further comprising:

confirming an identity of the user in the resulting uploaded user video or image by the one or more computer systems employing biometrics and/or screening the resulting uploaded user video or image by the one or more computer systems for keywords, profanity, gang signs, hand signals and/or hidden messages employing speech, gesture and/or optical marking recognition, prior to presenting the resulting uploaded user video or image to the resident of the controlled-environment facility for viewing; and sending an alert to an investigator and/or administrator and/or flagging a questionable uploaded user video or image, identifying a particular point in the questionable uploaded user video.

14. The method of claim 1 further comprising providing the user an option to add a caption to the selected or recorded user video or image.

15. The method of claim 1 further comprising providing an investigator an interface to review a resulting uploaded user video or image prior to presenting the resulting uploaded user video or image to the resident of the controlled-environment facility for viewing and providing the investigator an option to flag and/or append a note to the resulting uploaded user video or image.

16. A method, comprising:

performing, by one or more computer systems:

providing a resident of a controlled-environment facility a resident interface;

receiving a selection by the resident, via the resident interface, to send a resident video mail to a non-resident;

providing the resident, via the resident interface, a selection of a video or image, wherein the selection options provided to the resident include uploading a resident video or image and capturing a resident video or image;

accepting a selection option from the resident;

providing the resident, via the resident interface, a resident file selection interface to enter a resident video or image filename and/or browse for a resident video or image file, in response to selection by the resident to upload a resident video or image file;

providing the resident, via the resident interface, a resident video or image capture interface and capturing a resident video or image, via the resident video or image capture interface, in response to selection by the resident to capture a resident video or image;

providing the resident, via the resident interface, an option to extend predetermined storage limits applicable to the selected resident video or image file or the recorded resident video or image;

uploading the selected resident video or image file or the recorded resident video or image; and presenting a resulting uploaded resident video or image to the non-resident for viewing.

17. The method of claim 16, wherein providing the resident the resident interface comprises providing the resident interface on a controlled-environment facility computer system.

18. The method of claim 17, wherein capturing a resident video or image via the resident video or image capture interface employs a camera of, or connected to, the controlled-environment facility computer system.

19. The method of claim 16, wherein providing the resident the resident interface comprises providing the resident interface on a resident media device adapted and/or approved for use in the controlled-environment facility.

20. The method of claim 19, wherein capturing a resident video or image via the resident video or image capture interface employs a camera incorporated into the resident media device.

21. The method of claim 16, wherein presenting the uploaded resident video or image to the non-resident comprises providing the non-resident a non-resident interface.

22. The method of claim 21, wherein providing the non-resident the non-resident interface comprises providing the non-resident interface on a computer system of the non-resident.

23. The method of claim 21, wherein providing the non-resident the non-resident interface further comprises:
    presenting the non-resident a selection to view the resident video or image;
    presenting the non-resident an option to send a reply non-resident video or image to the resident;
    receiving a selection by the non-resident, via the non-resident interface, to send a return non-resident video mail to the resident;
    providing the non-resident, via the non-resident interface, a selection to either upload a video or image or to capture a non-resident video or image;
    accepting from the non-resident the selection via the non-resident interface to upload a non-resident video or image or to capture a non-resident video or image;
    providing the non-resident, via the non-resident interface, a non-resident file name entry interface to enter a non-resident video or image filename and/or an option to browse for a non-resident video or image file, in response to selection by the non-resident to upload a non-resident video or image file;
    providing the non-resident, via the non-resident interface, a non-resident video or image capture interface and capturing a non-resident video or image, via the non-resident video or image capture interface, in response to selection by the non-resident to capture a non-resident video or image;
    uploading a selected or recorded non-resident video or image; and
    presenting a resulting uploaded non-resident video or image to the resident.

24. The method of claim 23, wherein the option to send the reply non-resident video or image to the resident is presented as a result of the non-resident selecting to view the resident video or image, during and/or following playback of the resident video or image.

25. The method of claim 16, wherein the predetermined storage limits comprise at least one of a storage time and a file size for the video or image.

26. The method of claim 23, wherein providing the non-resident the non-resident interface comprises providing the non-resident interface on a computer system of the controlled-environment facility, and capturing a non-resident video or image via the non-resident video or image capture interface employs a camera of, or connected to, the controlled-environment facility computer system.

27. The method of claim 23, wherein providing the non-resident the non-resident interface comprises providing the non-resident interface on a non-resident media device approved and/or adapted for use in the controlled-environment facility by the non-resident, and capturing a non-resident video or image via the non-resident video or image capture interface employs a camera incorporated into the non-resident media device.

28. The method of claim 16, wherein the controlled-environment facility is a correctional facility and wherein the resident is a prisoner, inmate, detainee, or arrestee.

29. The method of claim 16 further comprising:
    confirming an identity of the resident in the resulting uploaded resident video or image by the one or more computer systems employing biometrics and/or screening the resulting uploaded resident video or image by the one or more computer systems for keywords, profanity, gang signs, hand signals and/or hidden messages employing speech, gesture and/or optical marking recognition, prior to presenting the resulting uploaded resident video or image to the non-resident for viewing; and
    sending an alert to an investigator and/or administrator and/or flagging a questionable uploaded resident video or image, identifying a particular point in the questionable uploaded resident video.

30. The method of claim 16 further comprising providing the resident an option to add a caption to the selected or recorded resident video or image.

31. The method of claim 16 further comprising providing an investigator an interface to review a resulting uploaded resident video or image prior to presenting the resulting uploaded resident video or image to the non-resident for viewing and providing the investigator an option to flag and/or append a note to the resulting uploaded resident video or image.

32. A non-transitory computer-readable storage medium having program instructions stored thereon that, upon execution by one or more computer systems, cause the one or more computer systems to:
    present a resident of a controlled-environment facility a resident interface;
    present the resident an option to send a resident video or image to a non-resident of the controlled-environment facility;
    receive a selection by the resident, via the resident interface, to send a resident video mail to the non-resident;
    provide the resident, via the resident interface, a selection of a video or image, wherein the selection options provided to the resident include uploading a resident video or image and capturing a resident video or image;

accept a selection option from the resident;

provide the resident, via the resident interface, a resident file name entry interface to enter a resident video or image filename and/or an option to browse for a resident video or image file, in response to selection by the resident to upload a resident video or image file;

provide the resident, via the resident interface, a resident video or image capture interface and capturing a resident video or image, via the resident video or image capture interface, in response to selection by the resident to capture a resident video or image;

providing the resident, via the resident interface, an option to extend predetermined storage limits applicable to the selected resident video or image file or the recorded resident video or image;

upload the selected resident video or image file or the recorded resident video or image; and present a resulting uploaded resident video or image to the non-resident.

33. The non-transitory computer-readable storage medium of claim 32, wherein the program instructions cause the one or more computer systems to provide the resident a selection to view a video or image sent by the non-resident of the controlled-environment facility, via the resident interface.

34. The non-transitory computer-readable storage medium of claim 33, wherein the program instructions cause the one or more computer systems to present the resident the option to send a resident video or image to the non-resident as a result of the resident selecting to view a video or image sent by the non-resident.

35. The non-transitory computer-readable storage medium of claim 34, wherein the program instructions cause the one or more computer systems to present the resident the option to send a resident video or image to the non-resident during and/or following playback of the non-resident video or image.

36. The non-transitory computer-readable storage medium of claim 34, wherein the predetermined storage limits comprise at least one of a storage time and a file size for the resident videos or images.

37. The non-transitory computer-readable storage medium of claim 32, wherein the program instructions cause the one or more computer systems to present the resident interface on a computer system of the controlled-environment facility, and capturing a resident video or image via the resident video or image capture interface employs a camera of, or connected to, the controlled-environment facility computer system.

38. The non-transitory computer-readable storage medium of claim 32, wherein the program instructions cause the one or more computer systems to present the resident the resident interface on a resident media device approved and/or adapted for use in the controlled-environment facility by the resident, and capturing a resident video or image via the resident video or image capture interface employs a camera incorporated into the resident media device.

39. The non-transitory computer-readable storage medium of claim 32, wherein the program instructions cause the one or more computer systems to:

confirm an identity of the resident in the resulting uploaded resident video or image employing biometrics and/or screen the resulting uploaded resident video or image for keywords, profanity, gang signs, hand signals and/or hidden messages employing speech, gesture and/or optical marking recognition, prior to presenting the resulting uploaded resident video or image to the non-resident for viewing; and send an alert to an investigator and/or administrator and/or flag a questionable uploaded resident video or image, identifying, a particular point in the questionable uploaded resident video.

40. The non-transitory computer-readable storage medium of claim 32, wherein the program instructions cause the one or more computer systems to provide the resident an option to add a caption to the selected or recorded resident video or image.

41. The non-transitory computer-readable storage medium of claim 32, wherein the program instructions cause the one or more computer systems to provide an investigator an interface to review a resulting uploaded resident video or image prior to presenting the resulting uploaded resident video or image to the non-resident for viewing and providing the investigator an option to flag and/or append a note to the resulting uploaded resident video or image.

42. A controlled-environment facility communications system providing video mail from non-residents of the controlled-environment facility to residents of the controlled-environment facility, the controlled-environment facility communications system comprising:

at least one processor; and a memory coupled to the at least one processor, the memory configured to store program instructions executable by the at least one processor of the controlled-environment facility communications system to cause the controlled-environment facility communications system to:

present the non-resident a user interface on a non-resident device;

receive a selection by the non-resident, via the user interface, to send non-resident video or image to a resident of a controlled-environment facility;

provide the non-resident, via the user interface, a selection of a video or image, wherein the selection options provided to the non-resident include uploading a non-resident video or image and capturing a non-resident video or image;

accept a selection option from the non-resident;

present the non-resident, via the user interface, a non-resident file selection interface to enter a non-resident video or image filename and/or browse for a non-resident video or image file, in response to selection by the non-resident to upload a non-resident video or image file;

present the non-resident, via the user interface, a non-resident video or image capture interface and capture a non-resident video or image, via the non-resident video or image capture interface using a camera of the non-resident device, in response to selection by the non-resident to capture a non-resident video or image;

provide the non-resident, via the user interface, an option to extend predetermined storage limits applicable to the selected non-resident video or image file or the recorded non-resident video or image;

upload the selected non-resident video or image file or the recorded non-resident video or image for presentation to the resident of the controlled-environment facility for viewing using the controlled-environment facility communications system and/or a resident media device approved and/or adapted for use in the controlled-environment facility by the resident;

present the resident a resident interface;

provide the resident a selection to view the non-resident video or image via the resident interface;

present the resident an option to send a resident video or image to the non-resident;

receive a selection of the resident, via the resident interface, to send a resident video or image to the non-resident;

provide the resident, via the resident interface, a selection to either upload a video or image or to capture a resident video or image;

accept from the resident the selection via the resident interface to upload a resident video or image or to capture a resident video or image;

provide the resident, via the resident interface, a resident file name entry interface to enter a resident video or image filename and/or an option to browse for a resident video or image file, in response to selection by the resident to upload a resident video or image file;

provide the resident, via the resident interface, a resident video or image capture interface and capturing a resident video or image, via the resident video or image capture interface using a camera connected to the controlled-environment facility communications system and/or the resident media device, in response to selection by the resident to capture a resident video or image;

provide the resident, via the resident interface, an option to extend predetermined storage limits applicable to the selected resident video or image file or the recorded resident video or image;

upload the selected resident video or image file or the recorded resident video or image; and present a resulting uploaded resident video or image to the non-resident on the non-resident device.

43. The controlled-environment facility communications system of claim 42, wherein the program instructions are further executable by the at least one processor of the controlled-environment facility communications system to cause the controlled-environment facility communications system to present the resident the option to send a resident video or image to the non-resident as a result of the resident selecting to view the non-resident video or image.

44. The controlled-environment facility communications system of claim 43, wherein the program instructions are further executable by the at least one processor of the controlled-environment facility communications system to cause the controlled-environment facility communications system to present the resident the option to send a resident video or image to the non-resident during and/or following playback of the non-resident video or image.

45. The controlled-environment facility communications system of claim 42, wherein the predetermined storage limits comprise at least one of storage time and a file size.

46. The controlled-environment facility communications system of claim 42, wherein the program instructions are further executable by the at least one processor of the controlled-environment facility communications system to cause the controlled-environment facility communications system to:

confirm an identity of the non-resident in the resulting uploaded non-resident video or image employing biometrics, and/or confirm an identity of the resident in the resulting uploaded resident video or image employing biometrics, and/or screen the resulting uploaded non-resident and resident videos or images for keywords, profanity, gang signs, hand signals and/or hidden messages employing speech, gesture and/or optical marking recognition, prior to presenting the resulting uploaded non-resident and resident videos or images to the resident of the controlled-environment facility and resident for viewing, respectively; and send an alert to an investigator and/or administrator and/or flagging a questionable uploaded resident and non-resident videos or images, identifying a particular point in the questionable uploaded videos.

47. The controlled-environment facility communications system of claim 42, wherein the program instructions are further executable by the at least one processor of the controlled-environment facility communications system to cause the controlled-environment facility communications system to provide the non-resident and/or resident an option to add a caption to the respective selected or recorded non-resident or resident video or image.

48. The controlled-environment facility communications system of claim 42, wherein the program instructions are further executable by the at least one processor of the controlled-environment facility communications system to cause the controlled-environment facility communications system to provide an investigator an interface to review the resulting uploaded video or image prior to presenting the resulting uploaded video or image for viewing and providing the investigator an option to flag and/or append a note to the resulting uploaded video or image.

* * * * *